United States Patent Office 3,268,418
Patented August 23, 1966

3,268,418
PROCESS FOR PRODUCING ANTIBIOTIC PA-180
Walter D. Celmer, New London, Conn., and Louis G. Nickell, Honolulu, Hawaii, assignors to Chas. Pfizer & Co., Inc., New York, N.Y., a corporation of Delaware
No Drawing. Filed Jan. 11, 1962, Ser. No. 165,673
3 Claims. (Cl. 195—80)

This invention relates to a new and useful plant inhibitory containing antibiotic called PA–180. More particularly, it is concerned with its production by fermentation and with methods for its recovery and concentration from crude solutions. The invention includes within its scope dilute forms of PA–180, as well as crude concentrates and its purified forms. This novel product is valuable as a reversible plant growth inhibitor which preferentially inhibits root formation and as an antibiotic.

In the past, various chemicals and antibiotics have been found to inhibit the growth of plants. These compounds reduce the overall plant height and frequently reduce the plants' growth rate, consequently, delaying flowering and prolonging the life span of the plant. Normally the younger the plant, the more influence a retardant compound will exert on the overall height and rate of development of a plant. The advantages and uses of these inhibitory compounds are: improving the form and attractiveness of many kinds of ornamental flowers; shortening the stem height of crop plants that are subject to wind damage; decreasing the stem height of certain crop plants to facilitate harvesting; to retard development, to extend the harvest of crop plants over a longer period and to decrease the size of certain ornamental trees, thus, decreasing maintenance costs. The production by microorganisms of substances inhibitory to the growth of higher plants is well documented. Curtis in Plant Physiology, 32, 56 (1957) reported two translocatable plant growth inhibitors which are produced by fungi. Brian in Symp. Soc. Exp. Biol., 11, 166 (1957) discussed four antibiotics which are inhibitory to root growth; two produced by actinomycetes (actidione and azaserine), one produced by a fungus (alternaric acid), and one produced by a bacterium (polymyxin).

The antibiotic of this invention is useful in separating and classifying mixtures of microorganisms for biological research and medical diagnostic purposes. It may also be employed as a disinfectant and bacteriostatic agent, in industrial fermentations to prevent contamination by sensitive organisms, and in tissue culture, e.g. for vaccine production.

The new plant inhibitory containing fermentation antibiotic is formed during the cultivation under controlled conditions of a microorganism which is a member of the genus Streptomyces. A living culture of this organism has been deposited with the American Type Culture Collection of Washington, D.C., and given the number ATCC 14443. The cultural characteristics of this microorganism were determined by planting a culture thereof on media normally used for the identification of stretomycetes and observing the growth and other changes incident thereto. This culture was identified by Dr. J. B. Routien as *Streptomyces fradiae* because it so closely resembled two authentic strains (W 3535 and NRRL 1195) of *Streptomyces fradiae* that were simultaneously compared with it. All three cultures had the same lavender-brown aerial mycelium, the same types of spore-chains and the same general color of vegetative mycelium.

Our strain differed from the other two in not liquefying gelatin, not hydrolyzing starch and in producing a dark pigment in milk. However, strains of *S. fradiae* are known that differ from the published description of this species (see Waksman's The Actinomycetes, volume II, 1961, p. 212), so the differences listed here are not critical.

The cultural characteristics of ATCC 14443 are set forth in Table I, wherein the results are based upon six tubes or plates of each medium incubated for two weeks.

TABLE I

| Medium | Amount of Growth | Aerial Mycelium and Sporulation | Soluble Pigment | Remarks |
|---|---|---|---|---|
| Glucose-asparagine agar | Good | Moderate amount; cream colored | Lacking | Reverse light yellow. |
| Synthetic agar | Moderate | Good production; pinkish lavender. | do | Reverse pale orange-cream. Spore chains scattered; hooks, loops and primitive spirals. |
| Nutrient Agar | Fair | Lacking | Slight brown | Reverse brown. |
| Glucose Agar | Good | do | Lacking | Reverse tan-cream. |
| Milk | do | Scant; whitish | Gray-brown | Coagulation and peptonization in some tubes, no change in others; pH changed from 6.5 to 7.1. |
| Cellulose | No growth | | | |
| Potato Plug | Fair | Lacking | Lacking | Vegetative mycelium tan to dark cream. |
| Dextrose Nitrate Broth | Good | Fair; white | do | Nitrites not detected, nitrates still present. |
| Gelatin | do | Good; grayish-white | Olive | No liquefaction. |
| Starch Plates | do | Good; white | Lacking | Reverse white to pale yellow; no hydrolysis. |
| Calcium Malate Plates | Excellent | Excellent; becoming lavender-brown. | do | Reverse pale yellow; malate digested. Spore chains in hooks, loops; spores oval to oblong, 0.9 to 1.5μ. |
| Peptone Iron Agar | | | | No H$_2$S produced. |

It is to be understood that for the production of the plant inhibitory containing PA–180 the present invention is not limited to the aforementioned organism or to organisms fully answering the above description which is given only for illustrative purposes. ATCC 14443 is a species which was isolated from the soil and when the term *Streptomyces fradiae*, ATCC 14443, is used, it is expressly desired and intended to include the use of mutants produced from the described organism by various means such as X-radiation, ultraviolet radiation, nitrogen mustards and the like; and also to include microorganisms of this same new species regardless of their origin.

The invention includes within its scope processes for growing the microorganism *Streptomyces fradiae* ATCC 14443. The cultivation of the microorganism preferably takes place in an aqueous nutrient medium at a temperature of about 25° C. to 35° C. and under submerged conditions of agitation and aeration. Nutrient media which are useful for these processes include a carbohydrate, such as sugars, starch, glycerol, corn meal; and a source of organic nitrogen, such as, for example, casein, soy bean meal, peanut meal, wheat gluten, cottonseed meal, lactalbumin and enzymatic digest of casein and tryptone. A source of growth such as distillers' solubles, yeast extract, molasses fermentation residues as well as mineral salts such as sodium chloride, potassium phosphate, sodium nitrate, magnesium sulfate and trace minerals such as copper, zinc and iron may also be utilized with desirable results. If excessive foaming is encountered during fermentation, anti-foaming agents such as vegetable oils may be added to the fermentation medium. A buffering agent such as calcium carbonate may also be added to the medium.

Inoculum for the preparation of PA-180 by the growth of ATCC 14443 may be obtained by employing growth from slants on such media as Emerson's agar or beef lactose. The growth may be used to inoculate either shake flasks or inoculum tanks for submerged growth or alternatively the inoculum tanks may be seeded from the shake flasks. The growth of the microorganism usually reaches its maximum in about two to four days. However, variation in the equipment used, the rate of aeration, the rate of stirring, etc. may affect the speed with which maximum activity is reached. In general, the fermentation is continued until a substantial amount of PA-180 is produced. A period of about twenty-four hours to six days is sufficient for most purposes. Aeration of the medium in tanks for submerged growth is maintained at the rate of about one-half to two volumes of free air per volume of broth per minute. Aeration may be maintained by suitable types of agitators generally familiar to those in the fermentation industry. Aseptic conditions must, of course, be maintained throughout the transfer of the inoculum and throughout the growth of the microorganism.

After growth of the microorganism, the mycelium may be removed from the fermentation broth by means of standard equipment, such as filter-presses, centrifuges, and so forth. Thereafter, PA-180 may be recovered from the fermentation broth by several different procedures. Alternatively, the whole broth may be used as is or it may be dried. The PA-180 may be extracted from the aqueous fermentation broth at alkaline pH's preferably between about 6 and 10, by means of a variety of water immiscible organic solvents, including aromatic hydrocarbons, esters, ketones, lower alcohols and halogenated hydrocarbons. Examples of these are diethyl ether, benzene, ethyl acetate, butyl acetate, methyl isobutyl ketone, butanol and chloroform. Subsequently, PA-180 is recovered by evaporating the water immiscible solvent to dryness. Further methods of recovery which suggest themselves include absorption on charcoal with subsequent elution and development on alumina columns.

The product of the aforementioned fermentation process is PA-180 which is a light tan solid. Papergram studies of this material utilizing various chemical and physical detection techniques disclosed that it is heterogeneous in nature and bioautographs showed the presence of several dominant antibiotic substances. PA-180 is non-toxic when administered to mice at a 200 mg./kg. dosage and its antibiotic activity is readily demonstrated against a variety of microorganisms. More particularly this activity has been determined for PA-180, and for the water soluble and ethanol soluble fractions thereof. This data is presented in Tables II, III, and IV, wherein the columns entitled mcg./ml. are the minimum inhibitory activities of PA-180, and the isolated fractions thereof.

TABLE II

| Organism: | PA-180 mcg./ml. |
|---|---|
| Micrococcus pyogenes var. aureus | 25 |
| Streptococcus pyogenes | 6.25 |
| Streptococcus faecalis | 3.12 |
| Erysipelothrux rhusiopathiae | >100 |
| Diplococcus pneumoniae | >100 |
| Corynebacterium diphtheriae | 6.25 |
| Listeria monocytogenes | >100 |
| Bacillus subtilis | 12.5 |
| Clostridium perfringens | >100 |
| Lactobacillus casei | >100 |
| Bacterium ammoniagenes | >100 |
| Aerobacter aerogenes | >100 |
| Escherichia coli | >100 |
| Proteus vulgaris | >100 |
| Pseudomonas aeruginosa | >100 |
| Salmonella typhosa | >100 |
| Salmonella pullorum | >100 |
| Salmonella gallinarum | >100 |
| Klebsiella pneumoniae | >100 |
| Nesseria gonnorheae | >100 |
| Hemophilus influenzae | >100 |
| Shigella sonnei | >100 |
| Erwinia amylovora | >100 |
| Phytomonas tumefaciens | >100 |
| Brucella bronchiseptica | >100 |
| Malleomyces mallei | >100 |
| Desulfovibrio desulfuricans | >100 |
| Vibrio comma | >100 pi |
| Pasteurella multocida | 100 |
| Candida albicans | 100 |
| Saccharomyces cerevisiae | 6.25 |
| Micrococcus pyogenes var. aureus 376 | 25 |
| Micrococcus pyogenes var. aureus 400 | 50 |
| Mycobacterium 607 | 50 |
| Mycobacterium berolinense | 12.5 |
| Pityrosporum ovale 12078 | >200 |
| Pityrosporium ovale Traub | 200 |

TABLE III

| Organism: | Water soluble fraction of PA-180 (mcg./ml.) |
|---|---|
| Staphylococcus aureus | 50 |
| Staphylococcus aureus 400 | >100 |
| Streptococcus pyogenes | 12.5 |
| Streptococcus pyogenes 98 | 50 |
| Streptococcus faecalis | 100 |
| Erysipelothrix rhusiopathiae | 12.5 |
| Aerobacter aerogenes | 25 |
| Escherichia coli | 100 |
| Proteus vulgaris | 25 |
| Pseudomonas aeruginosa | >100 |
| Salmonella typhosa | 50 |
| Klebsiella pneumoniae | 12.5 |
| Hemophilus pertussis | 1.56 |
| Klebsiella pneumoniae | 50 |

TABLE IV

| Organism: | Ethanol soluble fraction of PA-180 (mcg./ml.) |
|---|---|
| Staphylococcus aureus | 6.25 |
| Staphylococcus aureus 400 | >100 |
| Streptococcus pyogenes | 6.25 |
| Streptococcus pyogenes 98 | 6.25 |
| Streptococcus faecalis | 25 |
| Erysipelothrix rhusiopathiae | 6.25 |
| Aerobacter aerogenes | >100 |
| Escherichia coli | >100 |
| Proteus vulgaris | >100 |
| Pseudomonas aeruginosa | >100 |
| Salmonella typhosa | >100 |
| Klebsiella pneumoniae | 25 |
| Hemophilus pertussis | 25 |
| Klebsiella pneumoniae | 50 |

The plant inhibitory factor may be a small but potent fraction of PA-180. When plants are treated with PA-180, their growth is remarkably inhibited with no apparent toxic effects. This effect is reversible, that is, if the dwarfed plants are no longer treated with this material they immediately resume their normal growth. The effect of this new inhibitor was tested by the duckweed growth test which is widely employed in the evaluation of herbicides and growth inhibitors. This test is described in the Journal of Agricultural and Food Chemistry, volume 2, pages 178–182 (1954). The usual procedure employed in the duckweed test is to add the subject compound or mixtures to a synthetic nutrient solution which has been sterilized by filtration through a sintered glass funnel and to observe the growth of the duckweed (*Lemna minor*) over a period of time at various concentrations of the subject compounds or mixture. The plant nutrient media usually contain the cations, potassium, magnesium, calcium and the anions, sulfate, nitrate and phosphate. A detailed description of this type of nutrient media is found in the text, Plant Science Formula, McLean and Cook (Macmillan), 1950, second edition.

The following table lists the inhibitory effect of various concentrations of PA-180, along with similar data for other microbial metabolic products including antibiotics, some well-known plant growth inhibitors and some general metabolic inhibitors, on the growth of *Lemna minor* when studied by the duckweed test. The results are expressed as percent change of the controls on a wet weight basis. It was also noted that although PA-180 greatly inhibited the growth of *Lemna minor*, it did not exhibit any phytotoxicity.

solid carrier so that the mixture is in the form of powder or dust. This term is also meant to encompass mixtures which are suitable for use as sprays including solutions, suspensions or emulsions of the agent of this invention in a liquid propellant which boils below room temperature, at ordinary pressures.

The term "agricultural carrier" includes any and all of those agriculturally acceptable agents in which the product of this invention is dispersed. It includes, therefore, the solvents of a true solution, the liquid phase of suspensions, emulsions or sprays, the semi-solid carriers and the solid phase of dust and powders.

The are many solvents which can be utilized for the preparation of solutions, suspensions or emulsions of the material of this invention. Although any non-toxic liquid

TABLE V

| Compound | Percent Change from Control (wet weight basis) | | | | Comments |
| --- | --- | --- | --- | --- | --- |
| | 1 p.p.m. | 5 p.p.m. | 10 p.p.m. | 20 p.p.m. | |
| PA-180 | −15—−60 | −85 | −90 | −95 | Tiny plants at 5-20 p.p.m. |
| Actidione | Dead | Dead | Dead | Dead | |
| Anisomycin | −80 | −90 | −90 | Dead | Leaves small, chlorotic; complete root inhibition. |
| Azaserine | Dead | Dead | Dead | Dead | |
| Bacitracin | 0 | +80 | +100 | +130 | |
| Catenulin | Dead | Dead | Dead | Dead | |
| Duramycin | +35 | +35 | +35 | +30 | Root inhibition at 20 p.p.m. |
| Griseofulvin | −10 | −15 | −20 | | |
| Kojic Acid | +40 | +70 | +65 | +70 | |
| Oleandomycin PO₄ | 0 | 0 | 0 | 0 | |
| Penicillin G | +60 | +225 | +230 | +220 | |
| Penicillin S | +100 | +210 | +290 | +240 | |
| Polymyxin B | −15 | −15 | Dead | Dead | |
| Trichomycin | 0 | +5 | +10 | +35 | |
| Azauracil | −20 | Dead | Dead | Dead | |
| 3-amino-1,2,4-triazole | −5 | −10 | −50 | −70 | Chlorosis and root inhibition at 5-20 p.p.m. |
| (4-hydroxy-5-isopropyl-2-methyl-phenyl)-trimethyl ammonium chloride, 1-piperidine-carboxylate. | +10 | +20 | +20 | +25 | |
| (4-hydroxy-5-isopropyl-2-methyl-phenyl)-trimethyl ammonium iodide, 1-piperidine-carboxylate. | +15 | +15 | +10 | +10 | |
| 2,4-dinitrophenol | −25 | Dead | Dead | Dead | |
| (2-bromoethyl)trimethyl-ammonium bromide. | 0 | +10 | +5 | −55 | |
| (2-chloroethyl)trimethyl-ammonium chloride. | +55 | +20 | 0 | 0 | |
| (2,3-n-propylene)-trimethyl-ammonium chloride. | +40 | +25 | 10 | 0 | |
| Maleic hydrazide | 0 | −10 | −25 | −40 | Root inhibition at 10-20 p.p.m. |

The plant inhibitory portion of PA-180 is so active that a concentration level from about 0.10 part per million to about 1000 parts per million of the fermentation product PA-180 will produce an unusually high degree of inhibition. Although some effect may be obtained by using less than 0.10 part per million, the growth inhibitory effect may be variable and it is advisable not to use appreciably smaller amounts. The preferred amounts are levels in the range of about 1.0 part per million to about 100 parts per million, although this will vary somewhat with the particular plant being treated.

The material of this invention, PA-180 may be employed alone or in combination with other plant growth regulatory ingredients. When the material of this invention is employed, it is most economical to use it in a dispersed form in a suitable agricultural carrier.

When it is said that this material is dispersed, it means that the particles may be molecular in size and held in true solution in a siutable solvent or that the particles may be colloidal in size and dispersed through a liquid phase in the form of a suspension or an emulsion. It also includes particles which are dispersed in a semi-solid viscous carrier in which they may be actually dissolved or held in suspension with the aid of a suitable emulsifying or wetting agent. The term "dispersed" also means that the particles may be mixed with and spread throughout a may be employed, the preferred solvent is water. However, for certain applications it may be advantageous to resort to mixtures of solvents. If the active agent is to be applied as a spray, it is convenient to dissolve it in a suitable solvent and to disperse the resulting solution in a liquid propellant which boils below room temperature. For such applications it is a better to employ a true solution of the active agent, although it is possible to employ suspensions or emulsions.

For use as a powder or dust the active ingredient of this invention is mixed with any number of extending agents either organic or inorganic in nature which are suitable for the manufacture of an agricultural pulverulent preparation. Such extending agents include for example, urea, potting soil, inorganic mineral salts and others. These mixtures may be used in the dry form or, by the addition of water the dry powder can be dispersed as a solution or suspension suitable for use as sprays.

In all of the forms described above, the dispersions may be provided ready for use or they may be provided in a concentrated form suitable for mixing with other extending agents before use.

The following examples are given solely for the purpose of illustration only and are not to be construed as limitation of this invention, many variations of which are possible without departing from the spirit or scope thereof.

*Example I*

A slant of *Streptomyces fradiae* ATCC 14443 on Emerson agar was cultivated under controlled conditions to develop spores for the purpose of inoculating a nutrient medium of the following compositions:

| | Grams |
|---|---|
| Cerelose (dextrose hydrate) | 10 |
| Soybean meal | 10 |
| Sodium chloride | 5 |
| Distillers' solubles | 5 |
| Calcium carbonate | 1 |

This mixture of nutrients was diluted to a volume of one liter with water, adjusted to a pH of 7 with potassium hydroxide, and subjected to heat sterilization. Thereafter, the medium was cooled and the spores were added thereto under aseptic conditions. The cultivation of the organism was conducted in shaken flasks at about 25° C. for a period of four days. The mixture of broth and mycelium thus formed was then transferred to 20 times its volume of a sterile fermentation medium having the following composition:

| | Grams/liter |
|---|---|
| Cerelose | 10 |
| Sodium chloride | 5 |
| Curbay B–G (distillers' molasses solubles) | 5 |
| Corn starch | 10 |
| Soybean meal | 10 |

This medium was adjusted to pH 7 with potassium hydroxide, treated with 1 gram of calcium carbonate per liter, and sterilized in the usual manner, before transferring the broth and mycelium thereto. After seeding the medium with the organism from the shake flasks, the mixture was subjected to agitation and aeration under sterile conditions for three days. The mycelium was removed by filtration and the filtrate extracted twice with one-quarter volume of ethyl acetate. The ethyl acetate extract was concentrated in vacuo to one-twentieth its volume. This concentrate was washed twice with one-tenth volume of 5% sodium bicarbonate, and then twice with one-tenth volume of water. The ethyl acetate extract was then distilled azeotropically to remove the water present, and the inhibitory containing product PA–180, was precipitated by the addition of five volumes of hexane. The precipitated powder was removed by filtration. This powder represented a 100 fold concentration over the original broth after freeze drying the same. The product thus prepared was further purified by dissolving the same in methylene chloride and fractionally precipitating impurities with carbon tetrachloride, leaving the PA–180 in solution. Upon evaporation of the solvent, a tan colored solid was obtained.

*Example II*

Another fermentation medium was prepared from the following materials:

| | Grams |
|---|---|
| Corn starch | 10 |
| Glycerol | 10 |
| NZ Amine B (enzymatic digest of casein) | 20 |
| Distillers' solubles | 5 |

These materials were added to one liter of water and the pH of the resulting mixture was adjusted to between 7 and 7.2 with potassium hydroxide. Five grams of calcium carbonate were added to act as a buffer during the fermentation. The medium was then autoclaved and seeded under sterile conditions with *Streptomyces fradiae* ATCC 14443 inoculum prepared in accordance with the procedure set forth in Example I. After subjecting the inoculated medium to aeration and agitation under sterile conditions at about 35° C. for 2 days, the filtered broth was found to contain a very high concentration of PA–180.

*Example III*

To a mixture of 100 grams of pulverized calcium carbonate, 2 grams of olein and one gram of slaked lime, there was added sufficient PA–180 to give a mixture containing 100 parts per million of PA–180 and the mixture was ground in a ball mill. The resulting powder is easily scattered, has good adhesive properties and promotes growth when applied to plants.

*Example IV*

A mixture of 5 milligrams of PA–180, 25 grams of talcum, 4 grams of sodium dibutyl naphthalene sulfonate, 4 grams of casein and 5 grams of sodium carbonate was ground in a ball mill. The mixture was added to an equal quantity of ground calcium carbonate and thoroughly mixed. This powder may be suspended in water immediately before use and gives a growth-promoting suspension which is sufficiently stable for use in spraying applications.

*Example V*

A mixture is prepared containing 10 milligrams of PA–180, 20 grams of xylene and 80 grams of Turkey-red oil. This solution can be readily emulsified in water and the emulsion is suitable as a spray.

*Example VI*

An aqueous solution is prepared containing 0.005% of PA–180, 10% urea, 5% of phosphoric acid and 5% of potassium hydroxide. This solution is diluted with water immediately before use and gives a growth promotion solution suitable for application to plants.

What is claimed is:

1. A process for producing antibiotic PA–180 which comprises cultivating *Streptomyces fradiae* ATCC 14443 in an aqueous nutrient medium under submerged aerobic conditions until substantial activity is imparted to said medium.

2. A process as claimed in claim 1 wherein the product is recovered from the fermentation broth.

3. A process as claimed in claim 1 wherein the growth of the microorganism is conducted at a temperature between about 25° C. and about 35° C. for about two to four days.

References Cited by the Examiner

Pfizer, Handbook of Microbial Metabolites (1961), pp. 41, 42, 128, 140, 386–388.

JULIAN S. LEVITT, *Primary Examiner.*

S. ROSEN, *Assistant Examiner.*